(12) United States Patent
Kaita et al.

(10) Patent No.: US 7,056,994 B2
(45) Date of Patent: Jun. 6, 2006

(54) CATALYST COMPOSITION

(75) Inventors: Shojiro Kaita, Wako (JP); Zhaomin Hou, Wako (JP); Yasuo Wakatsuki, Wako (JP)

(73) Assignee: Riken, Wako (JP)

( * ) Notice: Subject to any disclaimer, the term of this patent is extended or adjusted under 35 U.S.C. 154(b) by 0 days.

(21) Appl. No.: 10/509,123

(22) PCT Filed: Mar. 28, 2003

(86) PCT No.: PCT/JP03/04013

§ 371 (c)(1),
(2), (4) Date: Sep. 28, 2004

(87) PCT Pub. No.: WO03/082932

PCT Pub. Date: Oct. 9, 2003

(65) Prior Publication Data

US 2005/0170951 A1     Aug. 4, 2005

(30) Foreign Application Priority Data

Mar. 29, 2002 (JP) .............................. 2002-094681

(51) Int. Cl.
*C08F 4/52* (2006.01)
*C08F 36/04* (2006.01)

(52) U.S. Cl. .................. 526/160; 526/117; 526/126; 526/127; 526/131; 526/133; 526/153; 526/164; 526/340.4; 526/943

(58) Field of Classification Search ........... 526/164, 526/340.4, 117, 131, 133, 160, 126, 127, 526/153, 943; 502/117, 129, 152, 154
See application file for complete search history.

(56) References Cited

U.S. PATENT DOCUMENTS

| 4,520,177 A * | 5/1985 | Jenkins ....................... 526/151 |
| 6,596,828 B1 * | 7/2003 | Kaito et al. ................... 526/164 |
| 2002/0119889 A1 | 8/2002 | Kaita et al. |

FOREIGN PATENT DOCUMENTS

| JP | 8-253521 A | 10/1996 |
| JP | 2002-256012 A | 9/2002 |
| WO | WO-00/52062 A1 | 9/2000 |

OTHER PUBLICATIONS

Kaita, et al., Stereospecific Polymerization of 1,3-Butadiene with Samarocene-Based Catalysts, Macromolecules, 1999, 32, 9078-9079.*

* cited by examiner

*Primary Examiner*—Fred Teskin
(74) *Attorney, Agent, or Firm*—Birch, Stewart, Kolasch & Birch, LLP

(57) ABSTRACT

The present invention relates to a catalyst composition for polymerization of a conjugated diene, comprising: (A) a metallocene-type complex represented by a general formula (I): $(C_5R^1R^2R^3R^4R^5)_a MX_b \cdot L_c$ (where, M represents a rare earth metal; $C_5R^1R^2R^3R^4R^5$ represents a substituted cyclopentadienyl group; $R^1$ to $R^5$ represent the same or different hydrocarbon groups (except when $R^1=R^2=R^3=R^4=R^5=$a methyl group); X represents a hydrogen atom, a halogen atom, an alkoxide group, a thiolate group, an amide group, or a hydrocarbon group having 1 to 20 carbon atoms; L represents a Lewis basic compound; "a" represents an integer of 1, 2, or 3; "b" represents an integer of 0, 1, or 2; and "c" represents an integer of 0, 1, or 2); and (B) an ionic compound composed of a non-coordinating anion and a cation, and/or an aluminoxane. The present invention provides a catalyst composition for polymerization for production of a polymer having a high content of cis-1,4-configuration in microstructure and a narrow molecular weight distribution.

7 Claims, No Drawings

CATALYST COMPOSITION

TECHNICAL FIELD

The present invention relates to a catalyst composition for polymerization of a conjugated diene. Further, the present invention relates to a production method for a conjugated diene polymer using the catalyst composition and to a novel conjugated diene polymer obtained through the production method.

BACKGROUND ART

Various proposals have been made so far on polymerization catalysts for conjugated dienes, and the polymerization catalysts play a very important role in industrial fields. In particular, various polymerization catalysts which provide a high cis-1,4-linkage content have been studied and developed to obtain conjugated diene polymers with enhanced performance in thermal and mechanical characteristics. For example, complex catalyst systems containing as a main component a compound of a transition metal such as nickel, cobalt, and titanium are known, and some of them have already been widely used in industrial applications as polymerization catalysts for butadiene, isoprene, etc. (see, End. Ing. Chem., 48, 784, 1956; JP 37-008198 B).

On the other hand, in order to attain a higher cis-1,4-linkage content and superior polymerization activity, complex catalyst systems which consist of a rare earth metal compound and an organometallic compound containing a group I to group III element have been studied and developed, and highly stereospecific polymerization has been studied actively (see, Makromol. Chem. Suppl., 4, 61, 1981; J. Polym. Sci., Polym. Chem. Ed., 18, 3345, 1980; DE 2,848,964; Sci. Sinica., 2/3, 734, 1980; Rubber Chem. Technol., 58, 117, 1985, etc.). Among those catalyst systems, complex catalysts containing as main components a neodymium compound and an organoaluminum compound were revealed to provide a high cis-1,4-linkage content and have superior polymerization activity. The catalysts have already been used in industrial applications as polymerization catalysts for butadiene, etc. (see, Macromolecules, 15, 230, 1982; Makromol. Chem., 94, 119, 1981).

With the recent progress of industrial technologies, requirements for polymeric materials as commercial products have become increasingly higher, and development of polymeric materials having still higher thermal characteristics (thermal stability, etc.) and mechanical characteristics (tensile modulus, bending modulus, etc.) has been desired strongly. As one of promising means for achieving the object, attempts have been made to produce a polymer having a high cis-1,4-configuration content in microstructure and a narrow molecular weight distribution by using a catalyst having a high polymerization activity to conjugated dienes.

The inventors of the present invention have found that: conjugated dienes can be efficiently polymerized by using a catalyst composition including a rare earth metal metallocene-type polymerization catalyst and a co-catalyst containing an ionic compound composed of a non-coordinating anion and a cation, and/or an aluminoxane in combination; and a conjugated diene polymer having an extremely high cis-1,4-configuration content in microstructure and a narrow molecular weight distribution can be produced by using the aforementioned catalyst composition for polymerization (see, JP 2000-313710 A).

However, development of a production method for a conjugated diene polymer having a still higher cis-1,4-configuration content in microstructure and a narrow molecular weight distribution has been desired.

Further, an organic solvent such as toluene is known to be toxic to a living body, and a development of a production method for a conjugated diene polymer having the aforementioned characteristics by using an organic solvent without toxicity to the living body is desired.

DISCLOSURE OF THE INVENTION

An object of the present invention is to provide a catalyst for the polymerization of a conjugated diene. More specifically, the object of the present invention is to provide a polymerization catalyst for producing polymers each having a high cis-1,4-configuration content in microstructure and a narrow molecular weight distribution. Another object of the present invention is to provide polymers having the aforementioned characteristics, and a production method for such polymers. Further, still another object of the present invention is to provide a production method for such polymers by performing a reaction in the presence of an organic solvent with less toxicity.

The inventors of the present invention have conducted various intensive studies to achieve the foregoing objects. As a result, the inventors of the present invention have found that: conjugated dienes can be efficiently polymerized by using a catalyst composition including a rare earth metal metallocene-type polymerization catalyst and a co-catalyst containing an ionic compound composed of a non-coordinating anion and a cation, and/or an aluminoxane in combination; a conjugated diene polymer having an extremely high cis-1,4-configuration content in microstructure and a narrow molecular weight distribution can be produced by using the aforementioned catalyst composition for polymerization; and a conjugated diene polymer having an extremely high cis-1,4-configuration content in microstructure and a narrow molecular weight distribution can be produced by using the aforementioned catalyst composition for polymerization in the presence of cyclohexane. The present invention was achieved based on these findings.

The present invention thus provides a catalyst composition for polymerization of a conjugated diene, which includes the following components: (A) a metallocene-type complex represented by the general formula (I): $(C_5R^1R^2R^3R^4R^5)_a MX_b \cdot L_c$ (where, M represents a rare earth metal; $C_5R^1R^2R^3R^4R^5$ represents a substituted cyclopentadienyl group; $R^1$ to $R^5$ represent the same or different hydrocarbon groups (except when $R^1=R^2=R^3=R^4=R^5=$a methyl group); X represents a hydrogen atom, a halogen atom, an alkoxide group, a thiolate group, an amide group, or a hydrocarbon group having 1 to 20 carbon atoms; L represents a Lewis basic compound; "a" represents an integer of 1, 2, or 3; "b" represents an integer of 0, 1, or 2; and "c" represents an integer of 0, 1, or 2); and (B) an ionic compound composed of a non-coordinating anion and a cation, and/or an aluminoxane. According to preferred embodiments of the present invention, there are provided: the aforementioned catalyst composition in which the metallocene-type complex is a samarium complex; the aforementioned catalyst composition in which the ionic compound is one or two or more selected from triphenylcarbonium tetrakis(pentafluorophenyl)borate, triphenylcarbonium tetrakis(tetrafluorophenyl)borate, N,N-dimethylanilinium tetrakis(pentafluorophenyl)borate, and 1,1'-dimethylferrocenium tetrakis(pentafluorophenyl)borate; the aforementioned catalyst composition in which the aluminoxane is methylaluminoxane and/or modified methylaluminoxane; and the aforementioned catalyst composition which further contains an organometallic compound of an group I to group III element in the periodic table.

From another perspective of the present invention, there are provided: a polymerization method for a conjugated diene in the presence of the aforementioned catalyst composition for polymerization; a polymerization method for a conjugated diene in the presence of the aforementioned catalyst composition for polymerization and a solvent such as cyclohexane; and a polymer obtained through the aforementioned polymerization methods for a conjugated diene. In addition, there is also provided a polymer having: a cis-1,4-configuration content in microstructure of 80.0 mol % or more, preferably 90.0 mol % or more, more preferably 95.0 mol % or more, and most preferably 98.0 mol % or more; and a molecular weight distribution Mw/Mn of 2.50 or less, preferably 2.20 or less, more preferably 2.00 or less, further more preferably 1.90 or less, and most preferably 1.80 or less. The above polymer can be produced by polymerizing a conjugated diene in the presence of the aforementioned catalyst composition for polymerization or in the presence of the aforementioned catalyst composition for polymerization and a solvent such as cyclohexane.

BEST MODE FOR CARRYING OUT THE INVENTION

A metallocene-type complex of the present invention includes a divalent or trivalent rare earth metal compound represented by the general formula (I): $(C_5R^1R^2R^3R^4R^5)_a MX_b \cdot L_c$ (where, M represents a rare earth metal; $C_5R^1R^2R^3R^4R^5$ represents a substituted cyclopentadienyl group; $R^1$ to $R^5$ represent the same or different hydrocarbon groups (except when $R^1=R^2=R^3=R^4=R^5=$a methyl group); X represents a hydrogen atom, a halogen atom, an alkoxide group, a thiolate group, an amide group, or a hydrocarbon group having 1 to 20 carbon atoms; L represents a Lewis basic compound; "a" represents an integer of 1, 2, or 3; "b" represents an integer of 0, 1, or 2; and "c" represents an integer of 0, 1, or 2).

In the general formula (I), $R^1$ to $R^5$ in the substituted cyclopentadienyl group represented by $C_5R^1R^2R^3R^4R^5$ may be the same or different, except when each of $R^1$ to $R^5$ represents a methyl group.

When "a" is 2 or 3, 2 or 3 substituted cyclopentadienyl groups may be the same or different. Further, when "b" or "c" is 2, each of 2 Xs or each of 2 Ls may be the same or different.

In the aforementioned general formula (I), an element selected from those of atomic numbers 57 to 71 in the periodic table can be used as the rare earth metal represented by M. Specific examples of the rare earth metal include lanthanum, cerium, praseodymium, neodymium, promethium, samarium, europium, gadolinium, terbium, dysprosium, holmium, erbium, thulium, ytterbium, and lutetium. Of those, samarium is preferred.

Types and substituting positions of substituents $R^1$ to $R^5$ of the substituted cyclopentadienyl group are not particularly limited. Examples of the substituent include a methyl group, an ethyl group, an n-propyl group, an isopropyl group, an n-butyl group, an isobutyl group, a sec-butyl group, a tert-butyl group, a hexyl group, a phenyl group, a benzyl group, and a hydrocarbon group containing a silicon atom such as a trimethylsilyl group. $R^1$ to $R^5$ may be bonded to a part of X through a crosslinking group such as a dimethylsilyl group, a dimethylmethylene group, a methylphenyl methylene group, a diphenylmethylene group, an ethylene group, or a substituted ethylene group. Alternatively, R may be bonded to each other through a crosslinking group such as a dimethylsilyl group, a dimethylmethylene group, a methylphenyl methylene group, a diphenylmethylene group, an ethylene group, or a substituted ethylene group.

Specific examples of the substituted cyclopentadienyl group include: a 1-ethyl-2,3,4,5-tetramethylcyclopentadienyl group; a 1-isopropyl-2,3,4,5-tetramethylcyclopentadienyl group; a 1-n-butyl-2,3,4,5-tetramethylcyclopentadienyl group; a 1-trimethylsilyl-2,3,4,5-tetramethylcyclopentadienyl group; a 1-benzyl-2,3,4,5-tetramethylcyclopentadienyl group; a 1-phenyl-2,3,4,5-tetramethylcyclopentadienyl group; a 1-trifluoromethyl-2,3,4,5-tetramethylcyclopentadienyl group; a 1-isobutyl-2,3,4,5-tetramethylcyclopentadienyl group; a 1-triethylsilyl-2,3,4,5-tetramethylcyclopentadienyl group; and a 1-triisopropylsilyl-2,3,4,5-tetramethylcyclopentadienyl group.

Preferred examples of the substituted cyclopentadienyl group include: a 1-ethyl-2,3,4,5-tetramethylcyclopentadienyl group; a 1-isopropyl-2,3,4,5-tetramethylcyclopentadienyl group; a 1-n-butyl-2,3,4,5-tetramethylcyclopentadienyl group; and a 1-trimethylsilyl-2,3,4,5-tetramethylcyclopentadienyl group.

The alkoxide group represented by X may be any of: an aliphatic alkoxy group such as a methoxy group, an ethoxy group, a propoxy group, an n-butoxy group, an isobutoxy group, a sec-butoxy group, or a tert-butoxy group; and an aryl oxide group such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, or a 2-isopropyl-6-neopentylphenoxy group. Of those, a 2,6-di-tert-butylphenoxy group is preferred.

The thiolate group represented by X may be any of: an aliphatic thiolate group such as a thiomethoxy group, a thioethoxy group, a thiopropoxy group, a thio-n-butoxy group, a thioisobutoxy group, a thio-sec-butoxy group, or a thio-tert-butoxy group; and an aryl thiolate group such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, or a 2,4,6-triisopropylthiophenoxy group. Of those, a 2,4,6-triisopropylthiophenoxy group is preferred.

The amido group represented by X may be any of: an aliphatic amido group such as a dimethylamido group, a diethylamido group, or a diisopropylamido group; and an arylamido group such as a phenylamido group, a 2,6-di-tert-butylphenylamido group, a 2,6-diisopropylphenylamido group, a 2,6-dineopentylphenylamido group, a 2-tert-butyl-6-isopropylphenylamido group, a 2-tert-butyl-6-neopentylphenylamido group, a 2-isopropyl-6-neopentylphenylamido group, or a 2,4,6-tert-butylphenylamido group. Of those, a 2,4,6-tert-butylphenylamido group is preferred.

The halogen atom represented by X may be any of: a fluorine atom, a chlorine atom, a bromine atom, or an iodine atom. Of those, a chlorine atom and an iodine atom are preferred.

Specific examples of the hydrocarbon group having 1 to 20 carbon atoms represented by X include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; hydrocarbon groups each containing a silicon atom such as a trimethylsilylmethyl group and a bistrimethylsilylmethyl group; and hydrocarbon groups each containing an oxygen atom such as a furyl group and a tetrahydrofuryl group. Of those, a methyl group, an ethyl group, an isobutyl group, a trimethylsilylmethyl group, a tetrahydrofuryl group, and the like are preferred.

A hydrogen atom, a halogen atom, or a hydrocarbon group having 1 to 20 carbon atoms is preferred as X.

The Lewis base compound represented by L is not particularly limited as long as the compound can coordinate to a metal by means of an electron pair, and the compound may be any of an inorganic compound and an organic compound. Examples of the Lewis base compound include but are not limited to ether compounds, ester compounds, ketone compounds, amine compounds, phosphine compounds, and silyloxy compounds.

Specific examples of the metallocene-type complex of a rare earth metal compound represented by the formula (I) include bis[tetramethylethyl cyclopentadienyl]bis(tetrahydrofuran) samarium, bis[tetramethyl(isopropyl)cyclopentadienyl]bis(tetrahydrofuran) samarium, bis[tetramethyl (n-butyl)cyclopentadienyl](tetrahydrofuran) samarium, and bis[ tetramethyl(trimethylsilyl)cyclopentadienyl](tetrahydrofuran) samarium.

The ionic compound used as a co-catalyst is not particularly limited as long as the compound is composed of a non-coordinating anion and a cation. Examples thereof include ionic compounds that can react with the aforementioned rare earth metal compounds to form a cationic transition metal compound. Examples of the non-coordinating anion include tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate.

Examples of the cation include a carbonium cation, an oxonium cation, an ammonium cation, a phosphonium cation, a cycloheptatrienyl cation, and a ferrocenium cation containing a transition metal. Specific examples of the carbonium cation include a trisubstituted carbonium cation such as a triphenylcarbonium cation and a trisubstituted phenylcarbonium cation. Specific examples of the trisubstituted phenylcarbonium cation include a tri(methylphenyl) carbonium cation and a tri(dimethylphenyl)carbonium cation. Specific examples of the ammonium cation include: a trialkylammonium cation such as a trimethylammonium cation, a triethylammonium cation, a tripropylammonium cation, a tributylammonium cation, or a tri(n-butyl)ammonium cation; an N,N-dialkylanilinium cation such as an N,N-diethylanilinium cation or an N,N-2,4,6-pentamethylanilinium cation; and a dialkylammonium cation such as a di(isopropyl)ammonium cation or a dicyclohexylammonium cation. Specific examples of the phosphonium cation include a triarylphosphonium cation such as a triphenylphosphonium cation, a tri (methylpheny) phosphonium cation, or a tri(dimethylphenyl)phosphonium cation.

A compound prepared by arbitrarily selecting a non-coordinating anion and a cation and combining the two can be preferably used as the ionic compound. Preferred examples of the ionic compound include triphenylcarbonium tetrakis(pentafluorophenyl)borate, triphenylcarbonium tetrakis(tetrafluorophenyl)borate, N,N-dimethylanilinium tetrakis(pentafluorophenyl)borate, and 1,1'-dimethylferrocenium tetrakis(pentafluorophenyl)borate. The ionic compound may be used alone, or two or more thereof may be used in combination. Examples of a Lewis acid that reacts with a transition metal compound to form a cationic transition metal compound include $B(C_6F_5)_3$ and $Al(C_6F_5)_3$. The acid may be used in combination with the aforementioned ionic compound.

The aluminoxane used as the co-catalyst may be obtained by contacting an organoaluminum compound with a condensation agent. More specific examples thereof include a linear aluminoxane and a cyclic aluminoxane represented by the general formula $(-Al(R')O-)_n$. In the formula, R' represents a hydrocarbon group having 1 to 10 carbon atoms, and the hydrocarbon group may be substituted with a halogen atom and/or an alkoxy group. The symbol "n" represents degree of polymerization, and "n" is preferably 5 or more, more preferably 10 or more. Examples of R' include a methyl group, an ethyl group, a propyl group, and an isobutyl group, and a methyl group is preferred. Examples of the organoaluminum compound used as a raw material of the aluminoxane include: trialkylaluminum such as trimethylaluminum, triethylaluminum, or triisobutylaluminum; and mixtures thereof. Trimethylaluminoxane produced by using trimethylaluminum as a raw material is particularly preferred. A modified aluminoxane produced by using a mixture of trimethylaluminum and triisobutylaluminium as a raw material can also be suitably used. A commercially available aluminoxane such as MMAO sold by Tosoh Finechem Corporation may also be used. The aluminoxane may be used alone, or two or more thereof may be used in combination. Further, the aluminoxane used as a co-catalyst may be used alone or in combination with an ionic compound.

The catalyst composition of the present invention contains the aforementioned components (A) and (B), and may further contain an organometallic compound of a groups I to III element in the periodic table as a component (C). Examples of the organometallic compound include an organic aluminum compound, an organic lithium compound, an organic magnesium compound, an organic zinc compound, and an organic boron compound. More specific examples thereof that may be used include methyllithium, butyllithium, phenyllithium, benzyllithium, neopentyllithium, (trimethylsilyl)methyllithium, bis(trimethylsilyl)methyllithium, dibutylmagnesium, dihexylmagnesium, diethylzinc, dimethylzinc, trimethylaluminum, triethylaluminum, triisobutylaluminium, trihexylaluminium, trioctylaluminium, and tridecylaluminium. Furthermore, examples thereof that may be used include: an organic metal halogen compound such as ethylmagnesium chloride, butylmagnesium chloride, dimethylaluminum chloride, diethylaluminum chloride, ethylaluminum sesquichloride, or ethylaluminum dichloride; and a hydrogenated organometallic compound such as diethylaluminum hydride or ethylaluminum sesquihydride. The organometallic compound may be used alone, or two or more thereof may be used in combination.

A mixing ratio of the aforementioned components (A) to (B) in the catalyst composition of the present invention may be suitably selected depending on the type of a monomer used for polymerization, and the type and conditions of a reaction. In a composition containing a rare earth metal compound and an aluminoxane, a ratio of the component (A) to the component (B) (molar ratio) is generally about 1:1 to 1:10,000, preferably 1:10 to 1:1,000, and more preferably 1:50 to 1:500. In a composition containing a rare earth metal compound and an ionic compound, a ratio of the component (A) to the component (B) (molar ratio) may be about 1:0.1 to 1:1,000, preferably 1:0.2 to 1:500, and more preferably 1:0.5 to 1:50. In a composition containing the component (C), a mixing ratio of the rare earth metal compound to the component (C) (molar ratio) may be about 1:0.1 to 1:1,000, preferably 1:0.5 to 1:100, and more preferably 1:1 to 1:50, for example.

The type of the conjugated diene compound as a monomer that can be polymerized through the polymerization method of present invention is not particularly limited. Examples of the monomer include 1,3-butadiene, isoprene, 1,3-pentadiene, 2-ethyl-1,3-butadiene, 2,3-dimethylbutadiene, 2-methylpentadiene, 4-methylpentadiene, and 2,4-hexadiene. Of those, 1,3-butadiene is preferred. The monomer component may be used alone, or two or more thereof may be used in combination.

The polymerization method of the present invention may be performed either in the presence or absence of a solvent. When a solvent is used, the type of the solvent is not particularly limited as long as the solvent is substantially inactive in the polymerization reaction and has sufficient solubility of the monomer and the catalyst composition therein. Examples of the solvent include: saturated aliphatic hydrocarbons such as butane, pentane, hexane, and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene, and chlorotoluene. A solvent used in the present invention preferably has no toxicity to a living body. Of those, cyclohexane is preferred. The solvent may be used alone, or two or more thereof may be used in combination.

A polymerization temperature in the polymerization method of the present invention may be in the range of from −100° C. to 100° C., preferably in the range of from −50° C. to 80° C., for example. A polymerization time may be about 1 minute to 12 hours, preferably about 5 minutes to 5 hours. However, those reaction conditions may be suitably selected depending on the type of monomer and the type of catalyst composition, and are not limited to the ranges exemplified above. After the polymerization reaction reaches a predetermined polymerization degree, the reaction may be stopped by adding a known polymerization terminator to a polymerization system. A produced polymer may be separated from the reaction system in a conventional manner. A cis-configuration content in microstructure of the polymer of the present invention is generally 80.0 mol % or more, preferably 90.0 mol % or more, more preferably 95.0 mol % or more, and most preferably 98.0 mol % or more. A molecular weight distribution Mw/Mn is 2.50 or less, preferably 2.20 or less, more preferably 2.00 or less, further more preferably 1.90 or less, and most preferably 1.80 or less. The polymer of present invention is expected to have superior thermal characteristics (thermal stability and the like) and mechanical characteristics (tensile modulus, bending modulus, and the like), and thus can be used for various applications as a polymeric material.

A polymer of the present invention has a high cis-configuration content in microstructure and has enhanced performance in thermal and mechanical characteristics. An improvement in a cis-configuration content of mere several % is very significant in industrial production of polymers.

A cis-configuration content in microstructure of a polymer of the present invention can be determined by: analyzing the polymer through $^1$HNMR and $^{13}$CNMR; and calculating the content from integration ratios of the obtained peaks.

EXAMPLES

Hereinafter, the present invention will be explained more specifically with reference to examples. However, the scope of the present invention is not limited to the examples. A microstructure of polybutadiene referred to in the examples was calculated from integration ratios of peaks observed by $^1$H NMR and $^{13}$C NMR [$^1$H NMR: δ4.8–5.0 (=CH$_2$ of 1,2-vinyl unit), 5.2–5.8 (—CH= of 1,4-unit and —CH= of 1,2-vinyl unit); $^{13}$CNMR: δ27.4 (1,4-cis unit), 32.7 (1,4-trans unit), 127.7–131.8 (1,4-unit), 113.8–114.8 and 143.3–144.7 (1,2-vinyl unit)]. A weight average molecular weight (Mw), a number average molecular weight (Mn), and a molecular weight distribution (Mw/Mn) were determined by GPC using polystyrene as a standard reference material.

Hereinafter in examples, THF represents a tetrahydrofuran ligand, iPr represents an isopropyl group, nBu represents an n-butyl group, TMS represents a trimethylsilyl group, and Cp* represents a pentamethylcyclopentadienyl ligand.

Example 1

In a glove box under nitrogen atmosphere, 0.025 mmol of bis[tetramethyethyl cyclopentadienyl]bis(tetrahydrofuran) samarium [(C$_5$Me$_4$Et)$_2$Sm(THF)$_2$] as a catalyst was placed into a sufficiently dried 100 ml pressure-resistant glass bottle, and dissolved in 40 ml of cyclohexane. Then, MMAO (toluene-soluble aluminoxane sold by Tosoh Finechem Corporation) was added into the bottle so that an element ratio Al/Sm became 200, and the bottle was sealed with a stopper. The bottle was then taken out from the glove box, and 2.7 g of 1,3-butadiene was placed into the bottle for polymerization at 50° C. for 20 minutes. After the polymerization, 10 ml of a methanol solution containing 10 wt % BHT [2,6-bis (t-butyl)-4-methylphenol] was added to stop the reaction. A polymer was separated by using a large volume of a methanol/hydrochloric acid mixed solvent and dried at 60° C. in a vacuum. An yield of the resulting polymer was 67 wt %. A cis-content in microstructure of the polymer was 97.3 mol %. A number average molecular weight was 567,100, and Mw/Mn was 1.87.

Example 2

An experiment in Example 2 was conducted in the same manner as in Example 1 except that bis[tetramethyl (isopropyl)cyclopentadienyl](tetrahydrofuran) samarium [(C$_5$Me$_4$iPr)$_2$Sm(THF)] was used as the catalyst. The yield of the resulting polymer was 100 wt %. The cis-content in microstructure of the polymer was 98.9 mol %. The number average molecular weight was 669,700, and Mw/Mn was 1.99.

Example 3

An experiment in Example 3 was conducted in the same manner as in Example 1 except that bis[tetramethyl(n-butyl) cyclopentadienyl](tetrahydrofuran) samarium [(C$_5$Me$_4$nBu)$_2$Sm(THF)] was used as the catalyst. The yield of the resulting polymer was 86 wt %. The cis-content in microstructure of the polymer was 97.1 mol %. The number average molecular weight was 438,200, and Mw/Mn was 1.87.

Example 4

An experiment in Example 4 was conducted in the same manner as in Example 1 except that bis[tetramethyl(trimethylsilyl)cyclopentadienyl](tetrahydrofuran) samarium [$(C_5Me_4TMS)_2Sm(THF)$] was used as the catalyst. The yield of the resulting polymer was 100 wt %. The cis-content in microstructure of the polymer was 98.4 mol %. The number average molecular weight was 419,300, and Mw/Mn was 1.89.

Comparative Example 1

An experiment in Comparative Example 1 was conducted in the same manner as in Example 1 except that bis[pentamethylcyclopentadienyl]bis(tetrahydrofuran) samarium [$(CP^*)_2Sm(THF)_2$] was used as the catalyst. The yield of the resulting polymer was 95.2 wt %. The cis-content in microstructure of the polymer was 96.5 mol %. The number average molecular weight was 549,600, and Mw/Mn was 1.90.

INDUSTRIAL APPLICABILITY

Use of the catalyst composition of present invention allows production of a polymer having an extremely high content of cis-1,4-configuration in microstructure and a narrow molecular weight distribution.

The invention claimed is:

1. A production method of polymer of conjugated dienes comprising:
reacting conjugated dienes with a catalyst composition for polymerization of a conjugated diene, comprising: (A) a metallocene complex represented by a general formula (I): $(C_5R^1R^2R^3R^4R^5)_aMX_b.L_c$ wherein M represents a rare earth metal; $C_5R^1R^2R^3R^4R^5$ represents a substituted cyclopentadienyl group selected from a 1-ethyl-2,3,4,5-tetramethylcyclopentadienyl group, a 1-isopropyl-2,3,4,5-tetramethylcyclopentadienyl group, a 1-n-butyl-2,3,4,5-tetramethylcyclopentadienyl group, a 1-trimethylsilyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trifluoromethyl-2,3,4,5-tetramethylcyclopentadienyl group, a 1-isobutyl-2,3,4,5-tetramethylcyclopentadienyl group, a 1-triethylsilyl-2,3,4,5-tetramethylcyclopentadienyl group, and a 1-triisopropylsilyl-2,3,4,5-tetramethylcyclopentadienyl group; X represents a hydrogen atom, a halogen atom, an alkoxide group, a thiolate group, an amide group, or a hydrocarbon group having 1 to 20 carbon atoms; L represents a Lewis basic compound; "a" represents an integer of 1 or 2; "b" represents an integer of 0, 1, or 2; and "c" represents an integer of 0, 1, or 2; and (B) an ionic compound composed of a non-coordinating anion and a cation, and/or an aluminoxane, wherein the polymerization reaction is performed in the presence of cyclohexane.

2. A production method of polymer of conjugated dienes, wherein a cis-1,4-configuration content in microstructure of the polymer is 97.0 mol % or more; and a molecular weight distribution Mw/Mn is 2.00 or less, comprising:
reacting conjugated dienes with a catalyst composition for polymerization of a conjugated diene, comprising: (A) a metallocene complex represented by a general formula (I): $(C_5R^1R^2R^3R^4R^5)_aMX_b.L_c$ wherein M represents a rare earth metal; $C_5R^1R^2R^3R^4R^5$ represents a substituted cyclopentadienyl group selected from a 1-ethyl-2,3,4,5-tetramethylcyclopentadienyl group, a 1-isopropyl-2,3,4,5-tetramethylcyclopentadienyl group, a 1-n-butyl-2,3,4,5-tetramethylcyclopentadienyl group, a 1-trimethylsilyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trifluoromethyl-2,3,4,5-tetramethylcyclopentadienyl group, a 1-isobutyl-2,3,4,5-tetramethylcyclopentadienyl group, a 1-triethylsilyl-2,3,4,5-tetramethylcyclopentadienyl group, and a 1-triisopropylsilyl-2,3,4,5-tetramethylcyclopentadienyl group; X represents a hydrogen atom, a halogen atom, an alkoxide group, a thiolate group, an amide group, or a hydrocarbon group having 1 to 20 carbon atoms; L represents a Lewis basic compound; "a" represents an integer of 1 or 2; "b" represents an integer of 0, 1, or 2; and "c" represents an integer of 0, 1, or 2; and (B) an ionic compound composed of a non-coordinating anion and a cation, and/or an aluminoxane, wherein the polymerization reaction is performed in the presence of cyclohexane.

3. The production method according to claim 1, wherein the substituted cyclopentadienyl group is selected from a 1-ethyl-2,3,4,5-tetramethylcyclopentadienyl group, a 1-isopropyl-2,3,4,5-tetramethylcyclopentadienyl group, a 1-n-butyl-2,3,4,5-tetramethylcyclopentadienyl group, and a 1-trimethylsilyl-2,3,4,5-tetramethylcyclopentadienyl group.

4. The production method according to claim 1, wherein the metallocene complex is a samarium complex.

5. The production method according to claim 1, wherein the ionic compound is one or two or more selected from triphenylcarbonium tetrakis(pentafluorophenyl)borate, triphenylcarbonium tetrakis(tetrafluorophenyl)borate, N,N-dimethylanilinium tetrakis (pentafluorophenyl)borate, and 1,1'-dimethylferrocenium tetrakis(pentafluorophenyl)borate.

6. The production method according to claim 1, wherein the aluminoxane is methylaluminoxane and/or modified methylaluminoxane.

7. The production method according to claim 1, wherein the catalyst composition further comprises an organometallic compound of a group I to group III element in the periodic table.

* * * * *